April 5, 1927.
A. H. WINNETT
COTTON CHOPPER
Filed Feb. 16, 1925
1,623,898
5 Sheets-Sheet 1
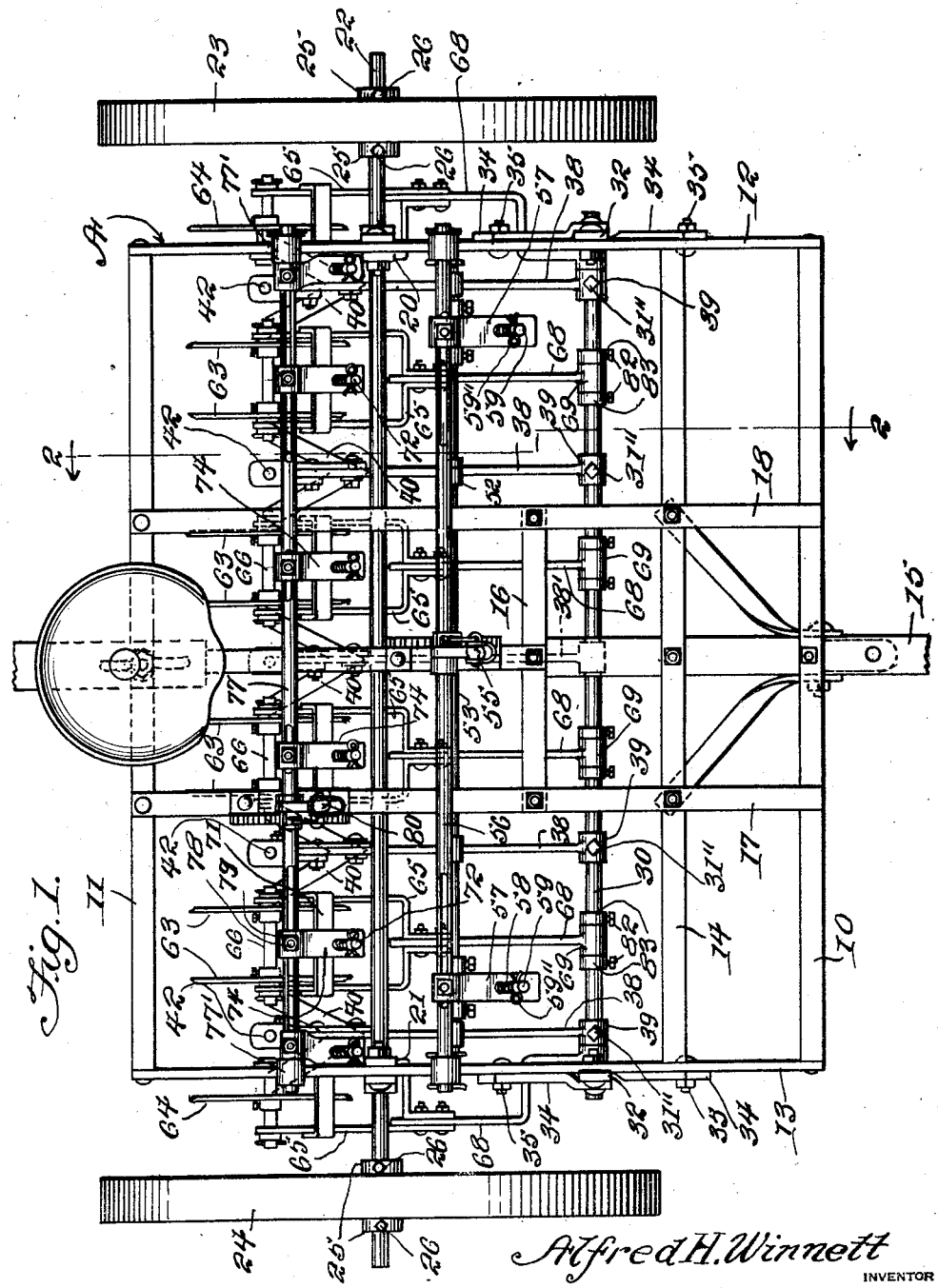

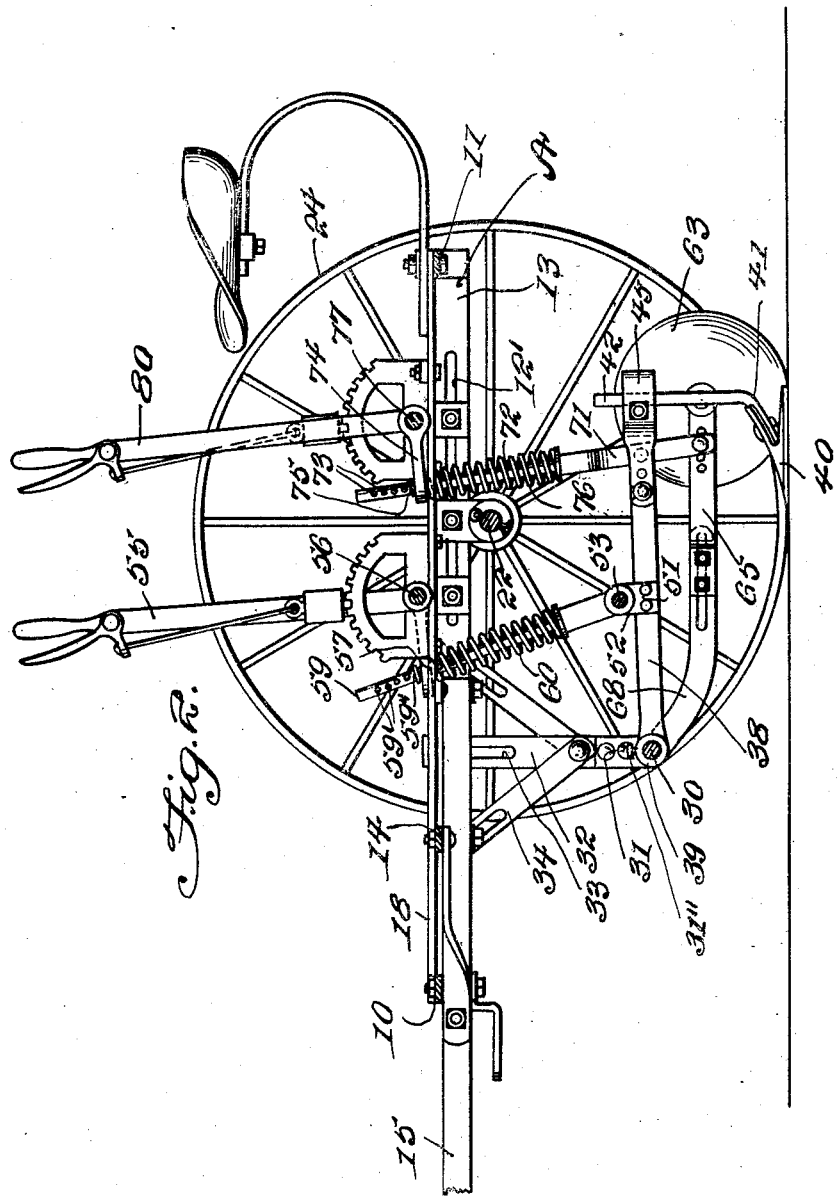

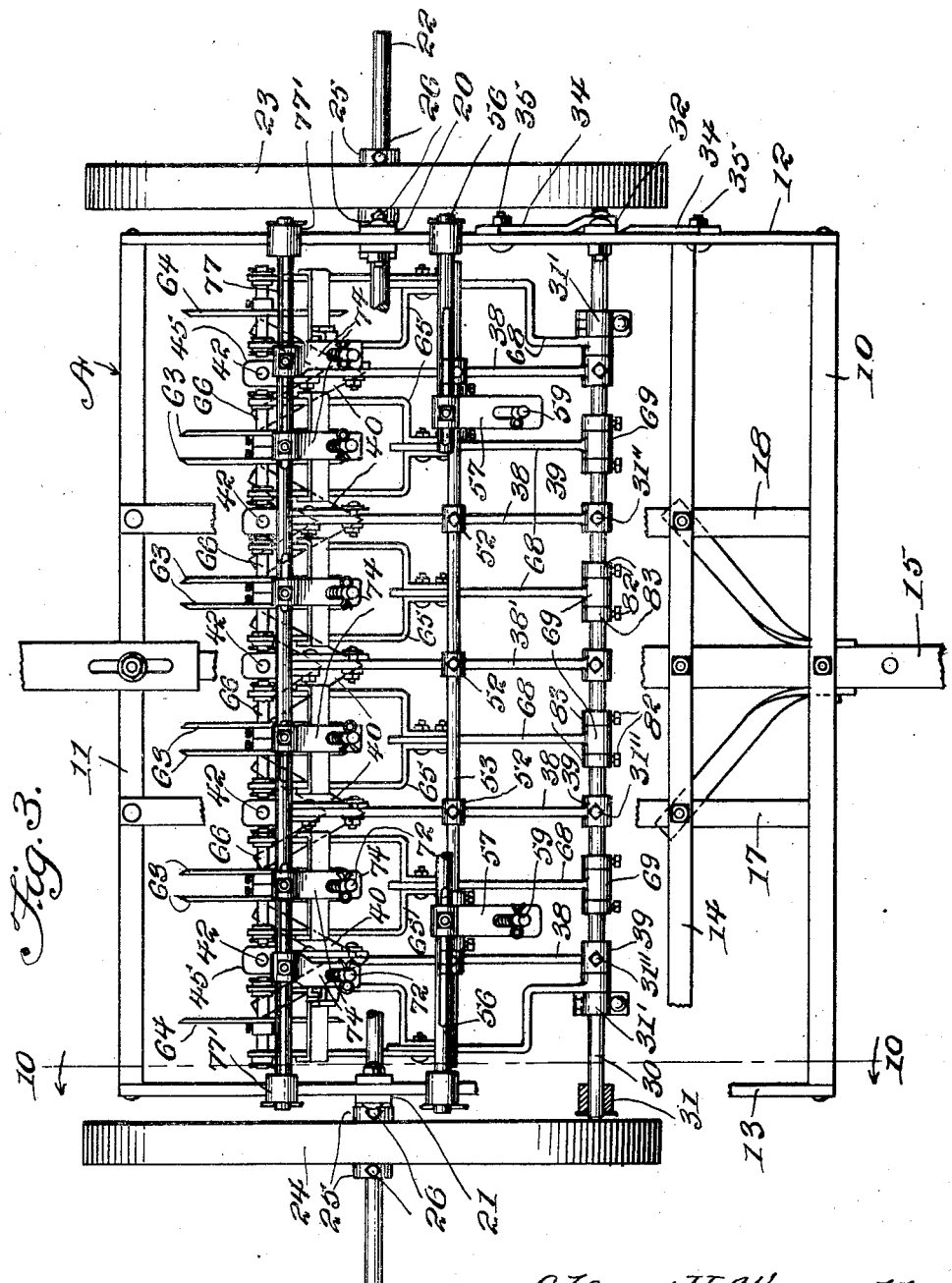

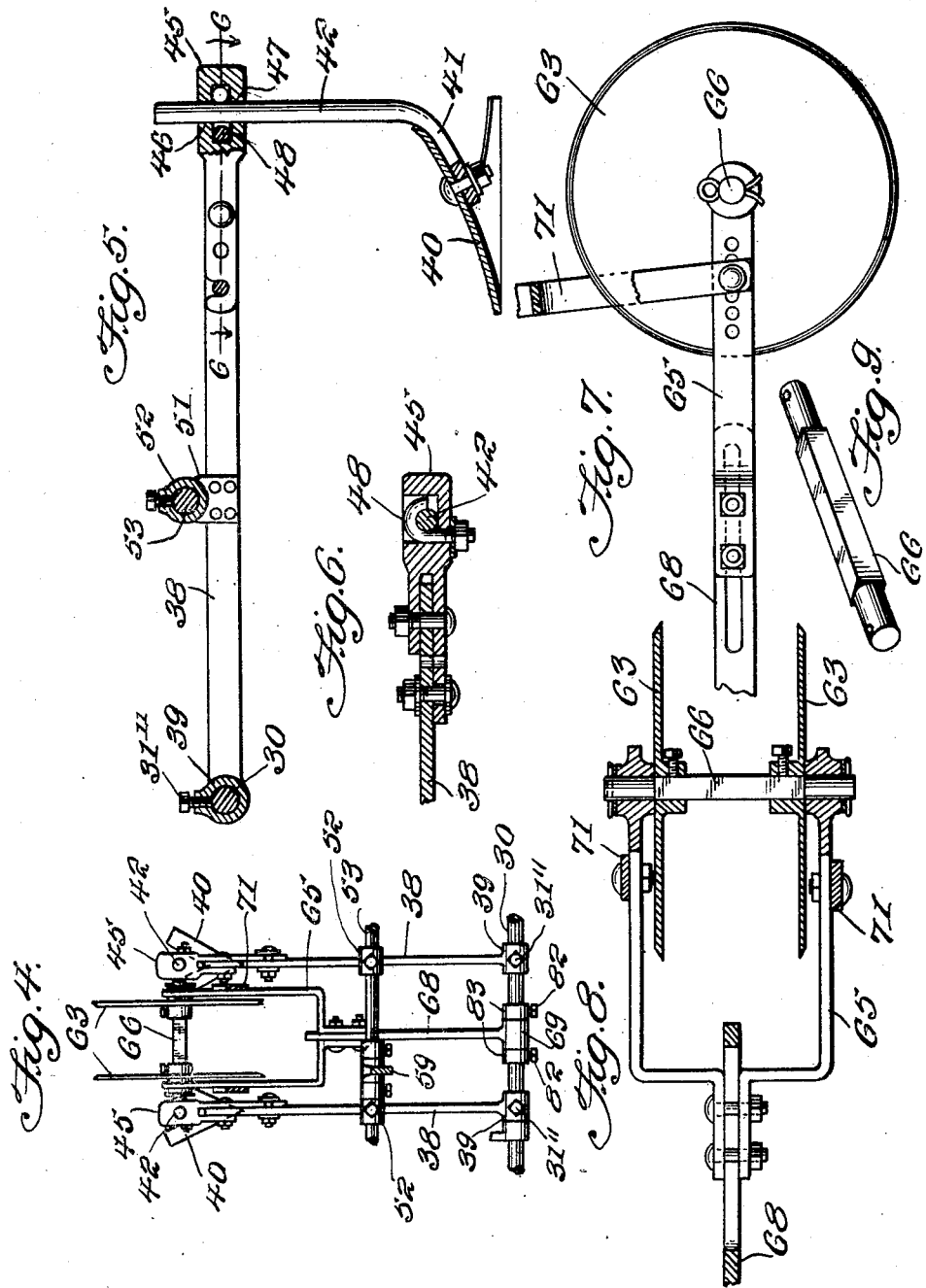

April 5, 1927. 1,623,898
A. H. WINNETT
COTTON CHOPPER
Filed Feb. 16, 1925 5 Sheets-Sheet 5
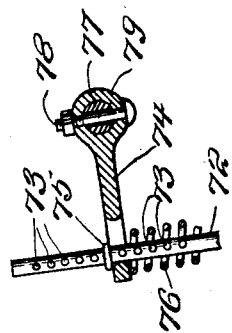
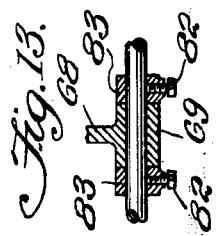
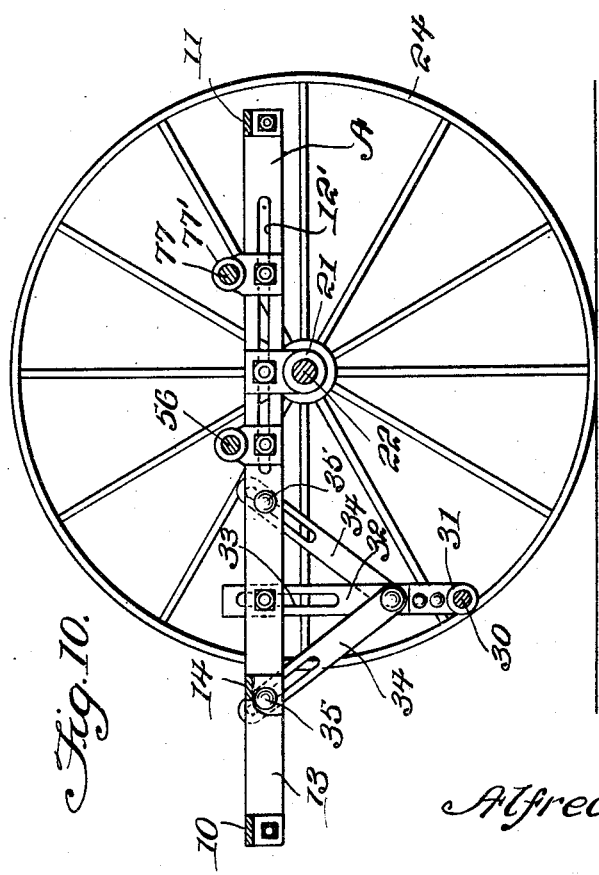
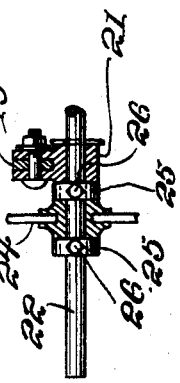
Alfred H. Winnett
INVENTOR
BY Victor J. Evans
ATTORNEY
WITNESS: J. T. L. Wright.

Patented Apr. 5, 1927.

1,623,898

UNITED STATES PATENT OFFICE.

ALFRED H. WINNETT, OF MERIDIAN, TEXAS.

COTTON CHOPPER.

Application filed February 16, 1925. Serial No. 9,555.

The object of this invention is to provide a machine to be driven across the rows of cotton for chopping out the weeds and grass, and thinning the cotton plants to the extent desired.

A further object is to provide a machine including a plurality of plows and plow beams, means for varying the spacing between the plows, and a plurality of disk guards, these guard elements being mounted between the plows, and being likewise adjustable with reference to lateral spacing.

A further object is to provide means for lifting all of the plows at one time, and means for lifting the disk guards at one time.

A still further object is to reduce the work incident to the operation specified, the present machine making it possible for one man or boy, with a team, to cover approximately the same number of acres as can be covered by six men working with hoes, in the same time, and at corresponding saving in cost.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a top plan view of the machine.

Figure 2 is a section on line 2—2 of Figure 1.

Figure 3 is a plan view, with part of the upper structure broken away, and showing a different adjustment of other elements.

Figure 4 is a detail view showing a unit assembly including plow beams 38 connected with transverse shaft 30, a U-shaped frame and guard disks mounted thereby.

Figure 5 is a detail view in section, longitudinally of the structure of Figure 1 and showing the mounting of the plow beams and standard for one of the plows.

Figure 6 is a section on line 6—6 of Figure 5.

Figure 7 is a detail view showing means for mounting and adjusting one of the guard disks 63.

Figure 8 is a horizontal section thru a pair of these guard disks 63, with the mounting means in plan and in section.

Figure 9 is a perspective view of an axle for the disks of Figure 8.

Figure 10 is a section on line 10—10 of Figure 3.

Figure 11 shows the mounting of wheel 24 on shaft 22, and one of the boxes 21 for the axle 22.

Figure 12 is a detail view showing the vertical adjustment provided for bar 72 carrying yoke 71 adapted for adjustable connection with the U-frame 65 of Figures 2 and 7.

Figure 13 shows the manner of mounting guard beam 68 of Figure 3 and Figure 1.

Figure 14 is a perspective view of a split hinged collar 31' shown in Figure 3 on shaft 30.

The main frame A includes front and rear transverse bars 10 and 11, side bars 12 and 13, and a transverse bar 14 parallel with element 10 and in the rear thereof. A tongue 15 is bolted to bars 10 and 14, and to a bar 16, which in turn is bolted to longitudinal bars 17 and 18 extending on opposite sides of the longitudinal axis of the frame.

The side bars 12 and 13 of the frame adjustably mount boxes 20, 21 in which main axle 22 is journaled, the outer ends of the axle carrying ground wheels 23, 24. Slots 12' in the frame members permit of this adjustment and permit of balancing the machine. Adjustment may be provided wherever required by forming several apertures for a given bolt or the like, or by slotting the members through which the bolts pass. Collars 25 retained by set screws 26 on axle 22, serve an obvious purpose.

A transverse bar 30 is supported in hangers 31 bolted to vertical bars 32, slotted at 33, and secured to the main frame by bolts passing respectively through the slots. Slotted braces 34 are adjustable with reference to the side bars of the frame, upon loosening bolts 35 passing through the slots, and these braces are bolted to vertical bar 32, on each side of the frame, near the lower ends of said bar.

The plow beams referred to below are connected with bar 30, and the guard beams, also referred to below, are swung from bar 30.

A plow beam 38 is rigidly connected with a collar or the like 39 encircling bar 30, the collar being slidable along the bar when set screw 31″ is loosened. This arrangement is duplicated in connection with each plow beam, except the central beam 38′ which is not adjusted laterally. The plows are designated 40, and are each carried by the curved portion 41 of the standard 42.

Each plow beam has connected with its rear end a device 45 having apertures 46, 47 in vertical alinement for the accommodation of the vertical element 42 connected with foot 41. Elements 42 are adjustable vertically by loosening the nuts of eye bolts 48 through which members 42 pass. The eye bolts produce clamping engagement with devices 45.

The plow beams 38 are connected by hangers 51 including collars 52 with transverse bar 53, adapted to move vertically all of the plow beams and plows at one time. This operation is effected by throwing lever 55 and rock shaft 56 connected therewith,—the shaft mounting arms 57 connected with the hangers, 51. Arms 57 are slotted at 58 for bars 59 secured to the hangers, the bars having a series of holes 59′ any one of which receives a pin 59″, for adjustment, and for maintaining an adjusted position. A coiled spring 60 encircles each bar 59 and bears on the arm 57, affording the resiliency desired under these conditions.

Two plow beams and plows are mounted on each side of the central beam and plow, and are adjustable laterally with reference thereto. Between each two plows are guard disks 63 arranged in pairs, and a single disk 64 is mounted beyond each end plow. Each pair of disks is mounted in a U frame 65 having bearings for an axle 66 mounting the two disks of the pair, and the U frame is carried by a guard beam 68 loosely connected by collar 69 and hanger 70 with bar 30.

Connected with each U frame 65 is a yoke 71 secured to vertical bar 72 having apertures 73 and passing loosely through slotted arm 74. A pin 75 passes through any of the apertures 73, providing adjustment, and a spring 76 provides resiliency in the manner before indicated.

Arms 74 are rigid with transverse rock shaft 77, slotted longitudinally for bolts 78 passing through eye portions 79 of the arms. Adjustment of the arms along this rock shaft 77 is thereby provided. Bearings 77′ mount shaft 77 on the main frame A, and the shaft is rocked by lever 80, for changing the vertical position of the guard disks.

The plows are adjusted longitudinally of the beams in the manner shown in Figure 5 illustrating the particular connection of devices 45 with the beams. The plow beams are adjustable laterally for different spacing by loosening set screws 31″ and shifting the position of the beams along bar 30. The guard beams are adjustable laterally by loosening set screws 82 of collars 83 encircling bar 30.

The maximum swath of the machine travelling transversely of the rows of cotton, may be 74 inches. Adjustment may be made for six, eight, ten, or twelve inch sweeps, leaving the hills of cotton a corresponding distance apart. The space between the disk guards may be varied from two inches to six inches, depending upon the amount of cotton which is is desired to leave—say from one to four stalks in a hill, with the hills spaced as indicated.

When smaller plows are used, and the beams are shifted laterally, split hinged collars such as 31′ are mounted on bar 30, in the position shown.

What I claim is:

1. In a cotton chopper, a frame, mounting means therefor, a transverse rotatable bar mounted beneath the frame, a plurality of plows, beams for the plows, means connecting the beams with the bar, guards mounted between the plows, beams for mounting the guards for swinging movement on the bar, a transverse bar connecting the plow beams and spaced from the bar first named, and means for lifting the second named transverse bar.

2. In a cotton chopper, a frame, mounting means therefor, a transverse bar rotatably mounted beneath the frame, a plurality of plows, beams for the plows, means connecting the beams with the bar, guards mounted between the plows and adjustable longitudinally with reference to the plow beams, means for mounting the guards for swinging movement with reference to the bar, a transverse bar connecting the plow beams, means for lifting the second named transverse bar, a rock shaft, means for adjustably connecting the guard beams with the rock shaft, and means for controlling said rock shaft.

3. In a cotton chopper, a frame, a transverse rotatable bar mounted beneath the frame, a plurality of laterally adjustable plows and beams therefor, means connecting the beams with the bar at corresponding ends of the beams, laterally adjustable guards mounted between the plows, beams for mounting the guards, means for adjusting the effective length of the guard beams, means loosely connecting the guard beams with the bar, and means for lifting the guard beams simultaneously.

4. In a cotton chopper, a plurality of plows, mounting means therefor, disk guards between each two plows and beyond the end plows, a transverse bar, guard beams and means connected therewith for mounting the disk guards, means loosely and adjustably connecting the guard beams with the transverse bar for movement longitudinally of the bar, the guard beams each comprising a two-part structure including relatively adjustable elements, and a lever, rock shaft and connecting devices for lifting all of the guard beams at one time, said rock shaft being slotted longitudinally and some of said connecting devices being adjustable longitudinally of the slotted portion.

5. In a cotton chopper, a frame, a transverse bar mounted beneath the frame, vertically adjustable bearings for rotatably mounting the bar, plows and beams therefor connected with the bar, disk guards between the plows, axles for the disk guards, a forked frame mounting each of the axles, a beam connected with each forked frame, and adjustable longitudinally with reference thereto, means for adjustably connecting each beam with the bar, permitting swinging movement with reference to the bar, a yoke connected with each forked frame, adjustable and resilient means connected with each yoke, and permitting change in elevation of the yoke and forked frame and the yielding movement thereof, a rock shaft controlling said means last named, and with reference to which these means last named are adjustable.

In testimony whereof I affix my signature.

ALFRED H. WINNETT.